US008585532B2

(12) United States Patent
Hwang et al.

(10) Patent No.: US 8,585,532 B2
(45) Date of Patent: *Nov. 19, 2013

(54) INDEPENDENTLY CONTROLLABLE TRANSMISSION MECHANISM WITH SERIES TYPES

(75) Inventors: Guan-Shyong Hwang, Kaohsiung (TW); Der-Min Tsay, Kaohsiung (TW); Jao-Hwa Kuang, Kaohsiung (TW); Tzuen-Lih Chern, Kaohsiung (TW)

(73) Assignee: National Sun Yat-Sen University of Kaohsiung, Kaohsiung (TW)

( * ) Notice: Subject to any disclaimer, the term of this patent is extended or adjusted under 35 U.S.C. 154(b) by 115 days.

This patent is subject to a terminal disclaimer.

(21) Appl. No.: 13/251,347

(22) Filed: Oct. 3, 2011

(65) Prior Publication Data

US 2012/0021865 A1 Jan. 26, 2012

Related U.S. Application Data

(63) Continuation-in-part of application No. 12/547,669, filed on Aug. 26, 2009.

(30) Foreign Application Priority Data

| Jul. 29, 2010 | (TW) | 099125043 A |
| Oct. 28, 2010 | (TW) | 099136938 A |
| Oct. 28, 2010 | (TW) | 099136946 A |

(51) Int. Cl.
*F16H 37/02* (2006.01)

(52) U.S. Cl.
USPC ........... 475/219; 475/207; 475/209; 475/218; 475/329; 475/330

(58) Field of Classification Search
USPC .................. 475/207, 209, 218, 219, 329, 330
See application file for complete search history.

(56) References Cited

U.S. PATENT DOCUMENTS

| 3,046,814 | A | * | 7/1962 | Soehrman | 475/211 |
| 4,191,070 | A | * | 3/1980 | McKinniss | 475/302 |
| 4,936,165 | A | * | 6/1990 | Doyle et al. | 475/211 |
| 6,387,004 | B1 | | 5/2002 | Parrish | |
| 2007/0173366 | A1 | * | 7/2007 | Goma Ayats | 475/207 |
| 2011/0053722 | A1 | * | 3/2011 | Hwang et al. | 475/1 |
| 2011/0111904 | A1 | * | 5/2011 | Hwang et al. | 475/1 |
| 2012/0021866 | A1 | * | 1/2012 | Hwang et al. | 475/330 |

FOREIGN PATENT DOCUMENTS

TW 242521 11/2005

* cited by examiner

*Primary Examiner* — Derek D Knight
(74) *Attorney, Agent, or Firm* — Alan Kamrath; Kamrath IP Lawfirm, P.A.

(57) ABSTRACT

An independently controllable transmission mechanism includes a first planetary gear train, a second planetary gear train, a first transmission-connecting set and a second transmission-connecting set. The first planetary gear train and the second planetary gear train are serially connected to form a series type. The independently controllable transmission mechanism has a first power output end, a transmission control end, a first power input end and a free-transmission end. The first power output end is provided on the first planetary gear train and the transmission control end is provided on the second planetary gear train. The first power input end is provided on the first transmission-connecting set and the free-transmission end is provided on the second transmission-connecting set. The transmission control end controls the free-transmission end to be functioned as a second power input end or a second power output end.

18 Claims, 15 Drawing Sheets

(A)

(B)

INDEPENDENTLY CONTROLLABLE TRANSMISSION MECHANISM WITH SERIES TYPES

CROSS REFERENCE TO RELATED APPLICATIONS

This application is a continuation-in-part of U.S. patent application Ser. No. 12/547,669, filed Aug. 26, 2009, which is hereby incorporated by reference in its entirety.

BACKGROUND OF THE INVENTION

1. Field of the Invention

The present invention relates to an independently controllable transmission mechanism with series types. More particularly, the present invention relates to the independently controllable transmission mechanism utilizing two serially-connected planetary gear trains and two transmission-connecting sets for variably controlling power input and output.

2. Description of the Related Art

Taiwanese Patent Pub. No. I242521 discloses a conventional gearbox structure for vehicles, including a main shaft on which to provide a slide. A forward gear and a drive gear are arranged at each side of the slide. A transmission shaft is provided with a reverse slide and a combination of a backward bevel gear and a forward bevel gear adjacent to the reverse slide. A final gear shaft is arranged between the backward bevel gear and the forward bevel gear. The forward gear and the drive gear are also arranged between the backward bevel gear and the forward bevel gear such that a width of the gearbox can be significantly reduced. Furthermore, the backward bevel gear and the forward bevel gear are used to engage with a transmission bevel gear provided on the final gear shaft so as to minimize the size of the gearbox. With regard to the problematic aspects naturally occurring during use of the gearbox system, the transmission in the gearbox system is susceptible to inefficiency due to the fact that the slide must result in frictional slide movements in the gearbox.

U.S. Pat. No. 6,387,004, entitled "Continuously Variable Transmission," discloses a continuously variable transmission system, including a first planetary gear train and a second planetary gear train. The first planetary gear train and the second planetary gear train are used to correspondingly transmit powers, which are generated from a first motor and a second motor, to a transmission shaft. However, the primary problem with such a transmission system is due to the fact that the powers generated from the first motor and the second motor must be constantly transmitted to the single transmission shaft via the first planetary gear train and the second planetary gear train. In this manner, the transmission shaft is fixedly designated as a single power input end while the first motor and the second motor are designated as two power input ends. The transmission system, however, cannot be functioned to variably control the power output. Hence, there is a need of providing an independently controllable transmission mechanism for variably controlling the power input, and for variably controlling the power output.

As is described in greater detail below, the present invention provides an independently controllable transmission mechanism utilizing serially-connected planetary gear trains and two transmission-connecting sets for variably controlling power input and output. The transmission mechanism includes a power output end, a transmission control end, a power input end and a free-transmission end. The transmission mechanism is capable of shifting the free-transmission end between a power input end and a power output end for independently controlling the power transmission. The transmission mechanism of the present invention can avoid using any additional frictionally sliding member so as to achieve increasing the efficiency of power transmission.

SUMMARY OF THE INVENTION

The primary objective of this invention is to provide an independently controllable transmission mechanism. Two serially-connected planetary gear trains and two transmission-connecting sets are utilized to variably control power input and output. The transmission mechanism includes a power output end, a transmission control end, a power input end and a free-transmission end. The transmission mechanism is capable of shifting the free-transmission end between a power input end and a power output end for independently controlling the power transmission. Accordingly, independently controlling the power transmission of the transmission mechanism can be successfully achieved.

Another objective of this invention is to provide an independently controllable transmission mechanism with series types. Two serially-connected planetary gear trains and two transmission-connecting sets are utilized to variably control power input and output. No additional frictionally sliding member is utilized in the transmission mechanism. Accordingly, the efficiency of the power transmission of the present invention can be successfully increased.

Another objective of this invention is to provide an independently controllable transmission mechanism with a compact type. Two serially-connected planetary gear trains and two transmission-connecting sets are assembled to reduced entire dimensions of the mechanism. Accordingly, the dimensions of the independently controllable transmission mechanism of the present invention can be successfully reduced.

The independently controllable transmission mechanism in accordance with an aspect of the present invention includes a first planetary gear train, a second planetary gear train, a first transmission-connecting set and a second transmission-connecting set. The first planetary gear train and the second planetary gear train are serially connected to form a series type. The independently controllable transmission mechanism has a first power output end, a transmission control end, a first power input end and a free-transmission end. The first power output end is provided on the first planetary gear train and the transmission control end is provided on the second planetary gear train. The first power input end is provided on the first transmission-connecting set and the free-transmission end is provided on the second transmission-connecting set. The transmission control end is used to control the free-transmission end to be functioned as a second power input end or a second power output end (i.e. to controllably shift the free-transmission end as the second power input end or the second power output end).

In a separate aspect of the present invention, the first planetary gear train includes a first rotational axle, a second rotational axle and a third rotational axle.

In a further separate aspect of the present invention, the first rotational axle of the first planetary gear train performs as the first power output end.

In yet a further separate aspect of the present invention, the second rotational axle of the first planetary gear train mechanically connects with the first transmission-connecting set.

In yet a further separate aspect of the present invention, the third rotational axle of the first planetary gear train mechanically connects with the second transmission-connecting set.

In yet a further separate aspect of the present invention, the first planetary gear train has a positive speed ratio or a negative speed ratio.

In yet a further separate aspect of the present invention, the second planetary gear train includes a first rotational axle, a second rotational axle and a third rotational axle.

In yet a further separate aspect of the present invention, the first rotational axle of the second planetary gear train performs as the transmission control end.

In yet a further separate aspect of the present invention, the second rotational axle of the second planetary gear train mechanically connects with the first transmission-connecting set.

In yet a further separate aspect of the present invention, the third rotational axle of the second planetary gear train mechanically connects with the second transmission-connecting set.

In yet a further separate aspect of the present invention, the second planetary gear train has a positive speed ratio or a negative speed ratio.

In yet a further separate aspect of the present invention, the first transmission-connecting set includes a rotational axle performed as the first power input end.

In yet a further separate aspect of the present invention, the second transmission-connecting set includes a rotational axle performed as the free-transmission end.

In yet a further separate aspect of the present invention, the first power output end and the free-transmission end extend in parallel and the first power input end and the transmission control end extend in parallel.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an independently controllable transmission mechanism with series types in accordance with the preferred embodiment of the present invention can be a wide variety of transmission-related mechanisms applicable to transmission gearboxes of ocean power generators (e.g., tidal power generator, wave power generator or ocean current power generator), wind power generators or hybrid vehicles, which are not limitative of the present invention.

Figure 1:
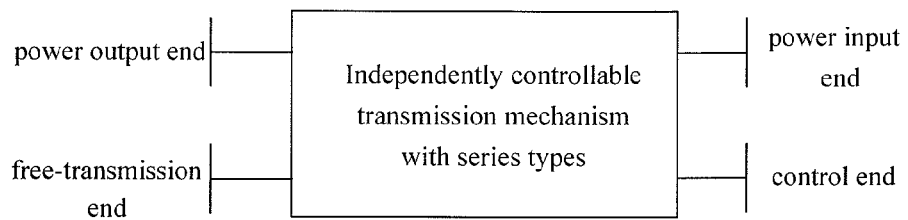
FIG. 1 is a schematic view of an independently controllable transmission mechanism with series types in accordance with a first preferred embodiment of the present invention.
Figure 2:
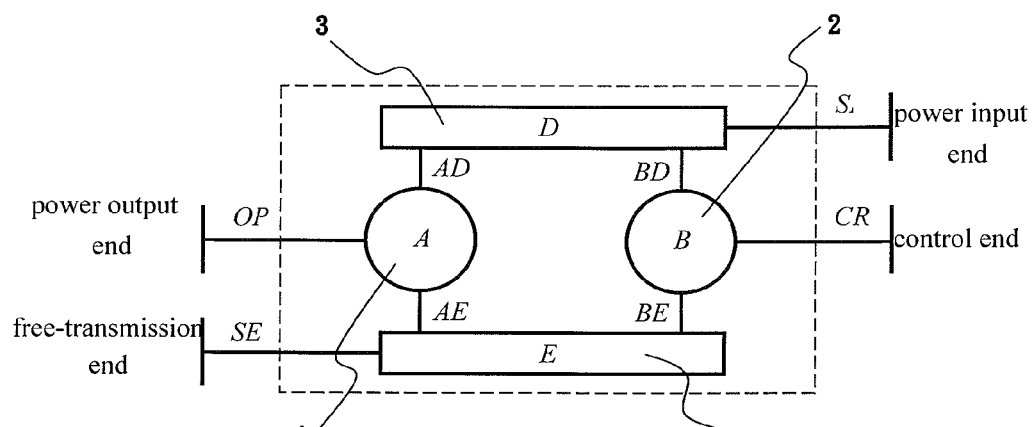
FIG. 2 is a schematic view of an internal structure of the independently controllable transmission mechanism with series types in accordance with the first preferred embodiment of the present invention.

FIG. 1 shows a schematic view of an independently controllable transmission mechanism with series types in accordance with a first preferred embodiment of the present invention; FIG. 2 shows a schematic view of an internal structure of the independently controllable transmission mechanism with series types in accordance with the first preferred embodiment of the present invention, depicted in FIG. 1. Referring to FIGS. 1 and 2, the independently controllable transmission mechanism of the first embodiment includes a first planetary gear train 1, a second planetary gear train 2, a first transmission-connecting set 3 and a second transmission-connecting set 4. The first planetary gear train 1 and the second planetary gear train 2 are combined to form a series type so as to reduce the dimensions of the independently controllable transmission mechanism. Furthermore, the first planetary gear train 1 and the second planetary gear train 2 mechanically connect with the first transmission-connecting set 3 and the second transmission-connecting set 4.

Referring again to FIGS. 1 and 2, the independently controllable transmission mechanism has a first power output end, a transmission control end, a first power input end and a free-transmission end which are separately arranged thereon. In the series type of the preferred embodiment the first power output end and the free-transmission end extend in parallel and the first power input end and the transmission control end extend in parallel.

Still referring to FIG. 2, in the first embodiment the first planetary gear train 1 has a first rotational axle identified as OP, a second rotational axle identified as AD and a third rotational axle identified as AE. The first rotational axle OP performs as the first power output end of the transmission mechanism. The second rotational axle AD mechanically connects with the first transmission-connecting set 3. The third rotational axle AE mechanically connects with the second transmission-connecting set 4. Correspondingly, the second planetary gear train 2 includes a first rotational axle identified as CR, a second rotational axle identified as BD and a third rotational axle identified as BE. The first rotational axle CR performs as the transmission control end of the transmission mechanism. The second rotational axle BD mechanically connects with the first transmission-connecting set 3. The third rotational axle BE mechanically connects with the second transmission-connecting set 4. Furthermore, the first transmission-connecting set 3 includes a rotational axle SD performed as the first power input end of the transmission mechanism. The second transmission-connecting set 4 includes a rotational axle SE performed as the free-transmission end of the transmission mechanism.

Referring again to FIGS. 1 and 2, in the first embodiment the transmission control end (first rotational axle CR) of the second planetary gear train 2 is used to control the free-transmission end (rotational axle SE) of the second transmission-connecting set 4 to be functioned as a second power input end or a second power output end (i.e. to controllably shift the free-transmission end SE as the second power input end or the second power output end). When the free-transmission end SE of the second transmission-connecting set 4 is functioned as the second power input end, the free-transmission end SE and the first power input end SD of the first transmission-connecting set 3 are capable of synchronously inputting power from different sources. Conversely, when the free-transmission end SE of the second transmission-connecting set 4 is functioned as the second power output end, the free-transmission end SE and the first power output end (first rotational axle OP) of the first planetary gear train 1 are capable of synchronously outputting power from the transmission mechanism.

Figure 3:
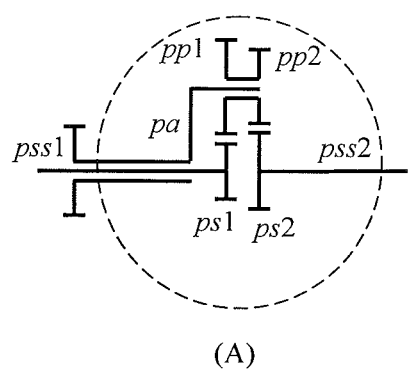
FIGS. 3A and 3B are internal schematic views of two types of planetary gear trains applied in the independently controllable transmission mechanism with series types in accordance with the preferred embodiment of the present invention.
Figure 3:
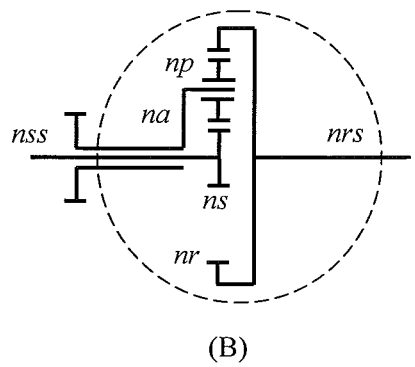

FIGS. 3A and 3B show internal schematic views of two planetary gear trains applied in the independently controllable transmission mechanism in accordance with the preferred embodiment of the present invention, wherein two examples of internal configurations of the planetary gear trains are shown, which are not limitative of the present invention.

Turning now to FIG. 3A, the first example of the planetary gear train includes a sun gear identified as ps1, a sun-gear rotational axle identified as pss1, a central gear identified as ps2, a central-gear rotational axle identified as pss2, at least one compound planet gear set formed with a first planet gear identified as pp1 and a second planet gear identified as pp2, and a planet gear carrier identified as pa. The first planet gear identified as pp1 and the second planet gear identified as pp2 are correspondingly engaged with the sun gear ps1 and the central gear ps2. The sun-gear rotational axle pss1 and the planet gear carrier pa are in perfect alignment with each other and coaxial. When the planet gear carrier pa is fixed, the sun-gear rotational axle pss1 and the central-gear rotational axle pss2 have same rotational directions and a positive ratio of rotational speeds. As is explained above, the planetary gear train is selected from a planetary gear train with a positive speed ratio.

Referring again to FIGS. 2 and 3A, the sun-gear rotational axle pss1, the central-gear rotational axle pss2 and the planet gear carrier pa can be performed as the first rotational axle OP, the second rotational axle AD and the third rotational axle AE of the first planetary gear train 1. Alternatively, the sun-gear rotational axle pss1, the central-gear rotational axle pss2 and the planet gear carrier pa can be performed as the first rotational axle CR, the second rotational axle BD and the third rotational axle BE of the second planetary gear train 2.

Turning now to FIG. 3B, the second example of the planetary gear train includes a sun gear identified as ns, a sun-gear rotational axle identified as nss, a ring gear identified as nr, a ring-gear rotational axle identified as nrs, at least one planet gear identified as np and a planet gear carrier identified as na. When the planet gear carrier na is fixed, the sun-gear rotational axle nss and the ring-gear rotational axle nrs are rotated in reverse directions and have a negative ratio of rotational speeds. As is explained above, the planetary gear train is selected from a planetary gear train with a negative speed ratio.

Referring again to FIGS. 2 and 3B, the sun-gear rotational axle nss, the ring-gear rotational axle nrs and the planet gear carrier na can be performed as the first rotational axle OP, the second rotational axle AD and the third rotational axle AE of the first planetary gear train 1. Alternatively, the sun-gear rotational axle nss, the ring-gear rotational axle nrs and the planet gear carrier na can be performed as the first rotational axle CR, the second rotational axle BD and the third rotational axle BE of the second planetary gear train 2.

Figure 4:
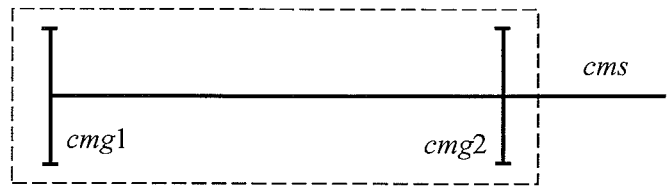
FIG. 4 is an internal schematic view of a transmission-connecting set applied in the independently controllable transmission mechanism with series types in accordance with the preferred embodiment of the present invention.
Figure 5:
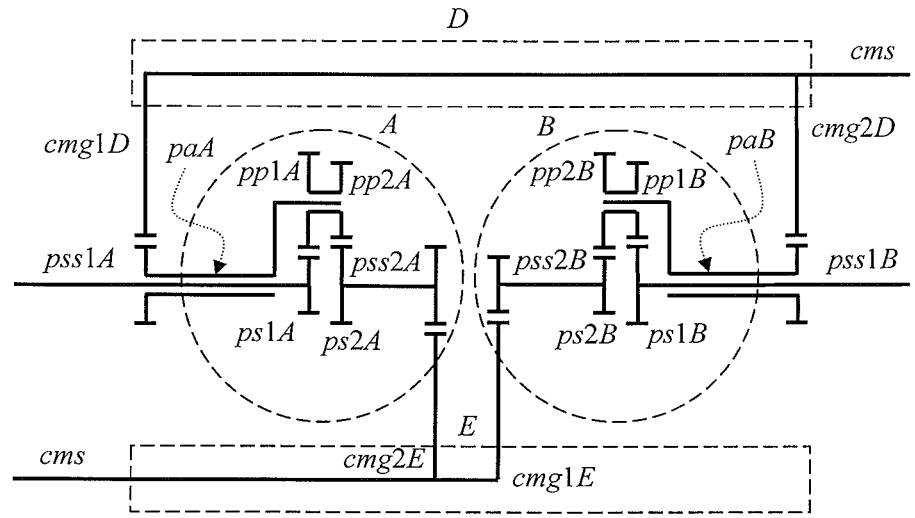
FIGS. 5 through 29 are similar internal schematic views of several combinations of two serially-connected planetary gear trains and two transmission-connecting sets formed in the independently controllable transmission mechanism in accordance with first through twenty-fifth embodiments of the present invention.
Figure 6:
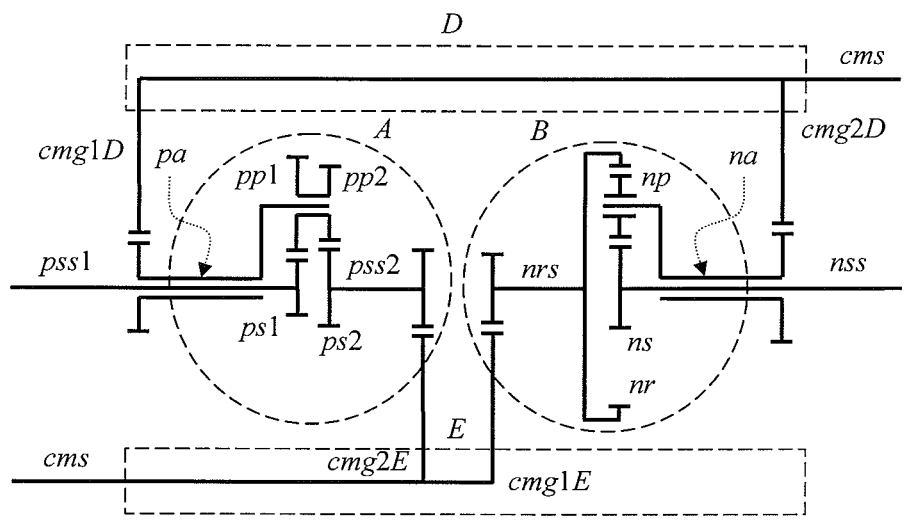
Figure 7:
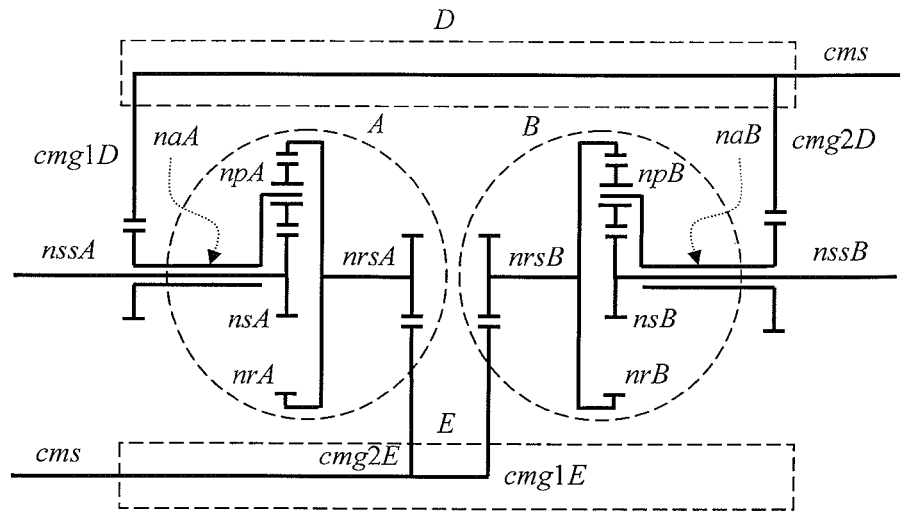
Figure 8:
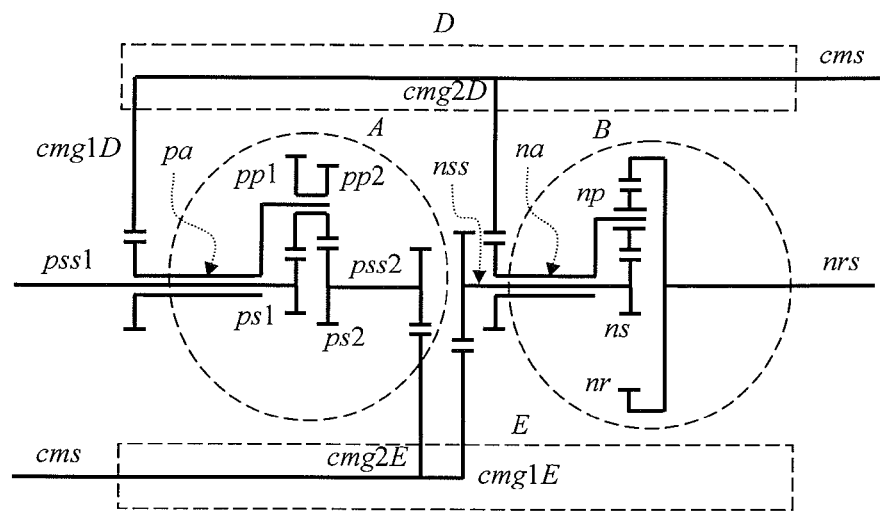
Figure 9:
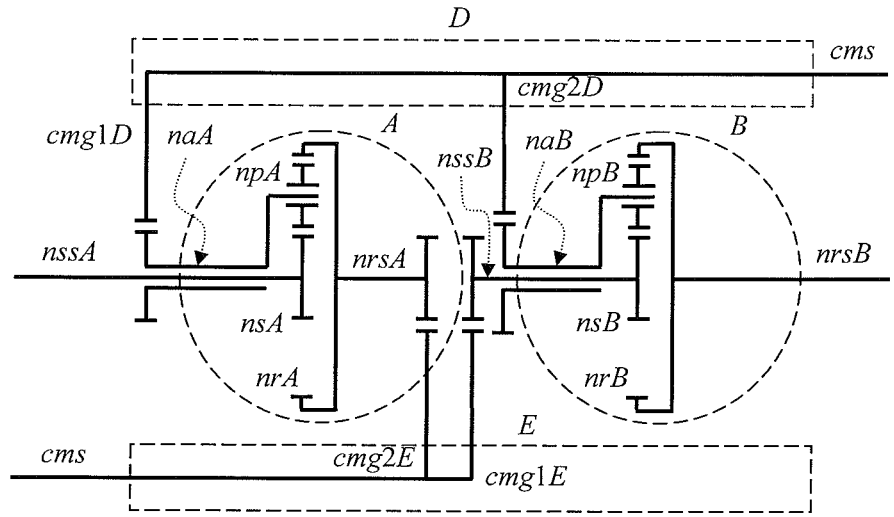
Figure 10:
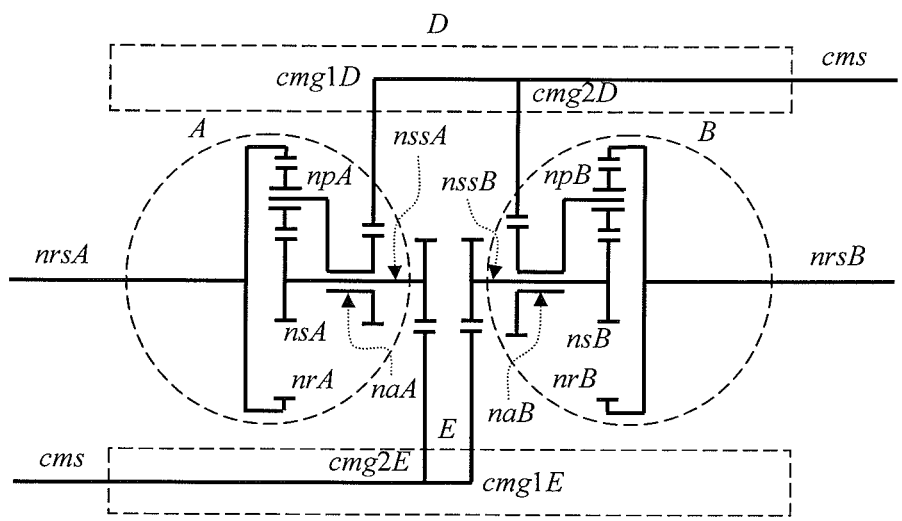
Figure 11:
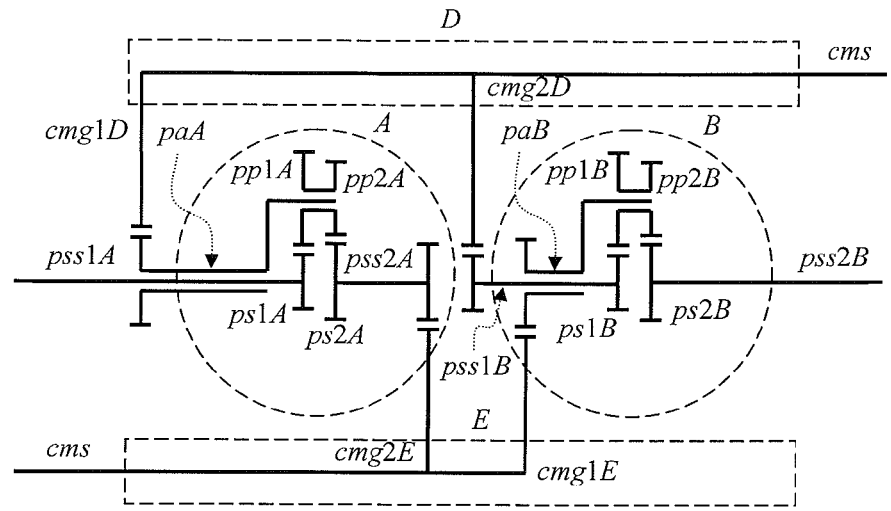
Figure 12:
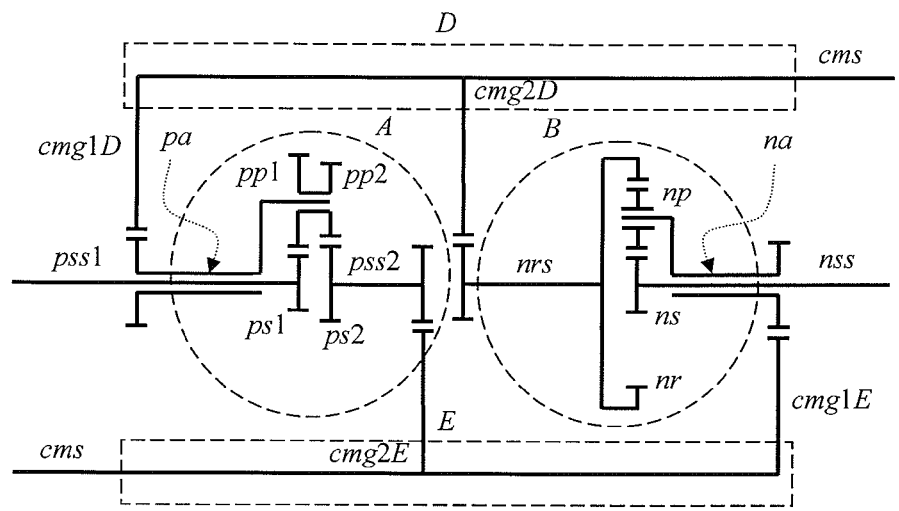
Figure 13:
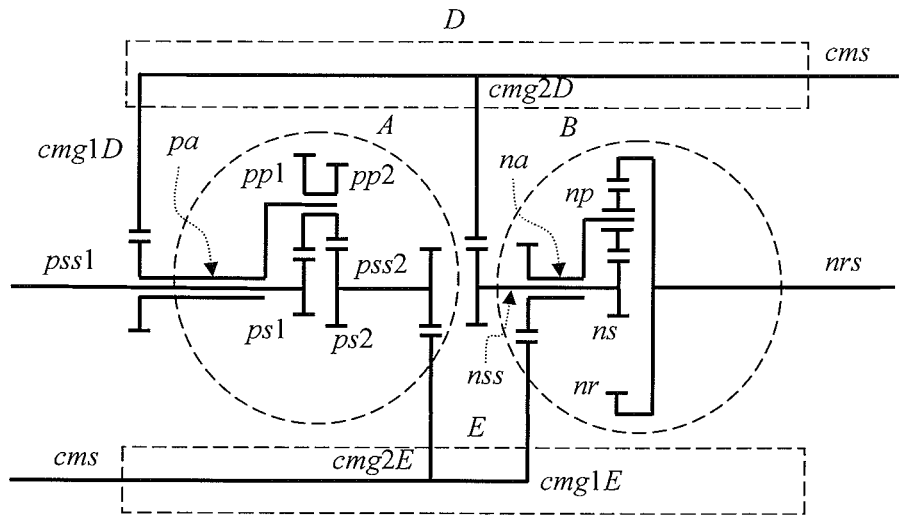
Figure 14:
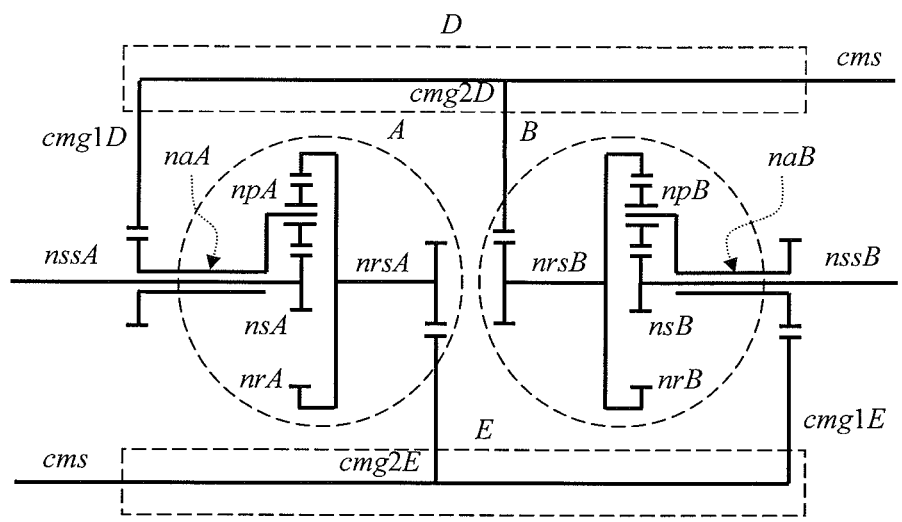
Figure 15:
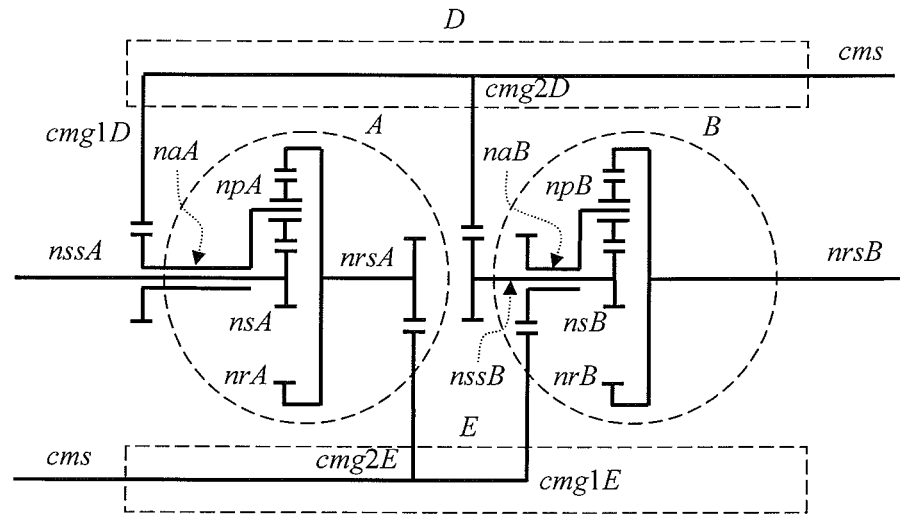
Figure 16:
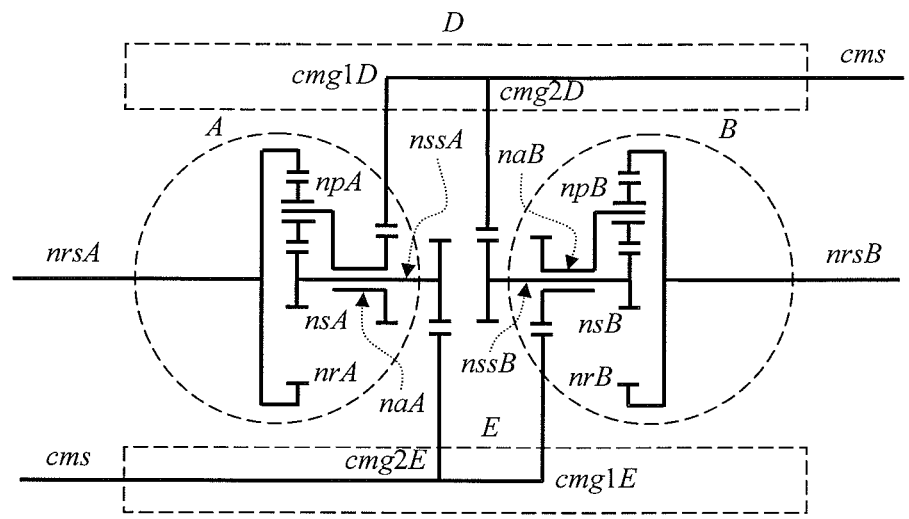
Figure 17:
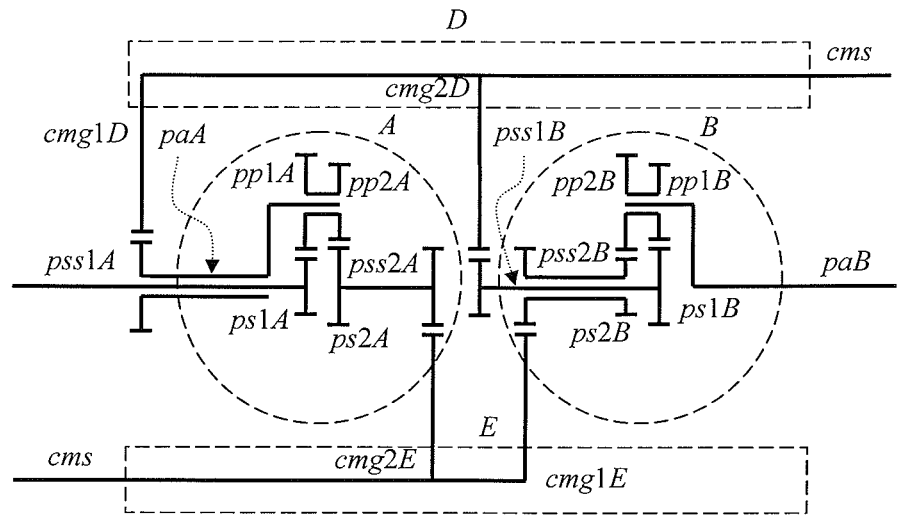
Figure 18:
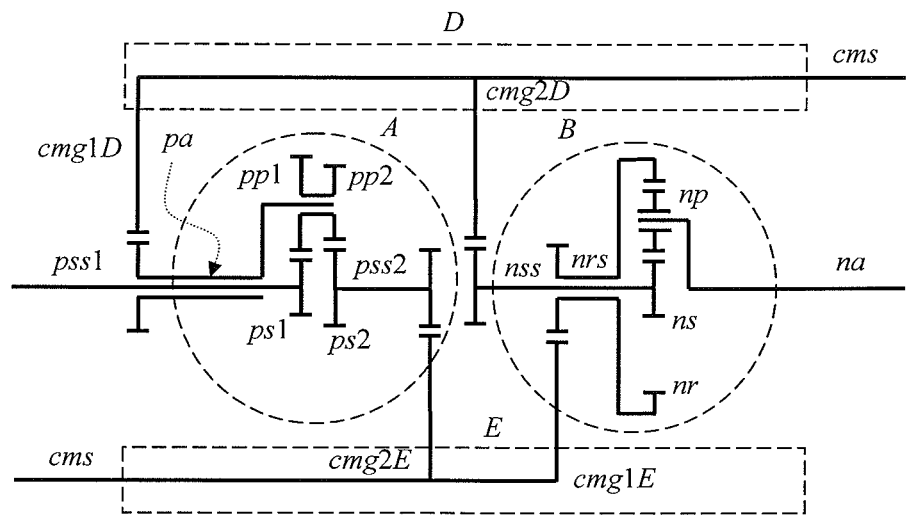
Figure 19:
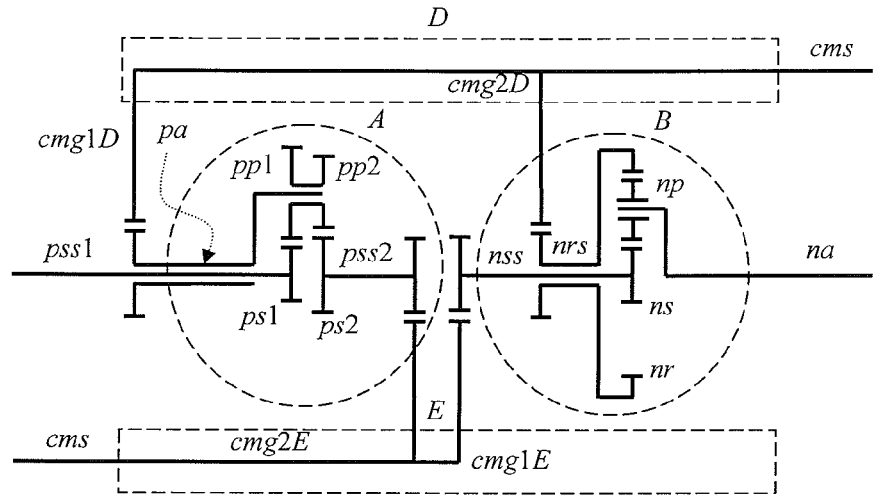
Figure 20:
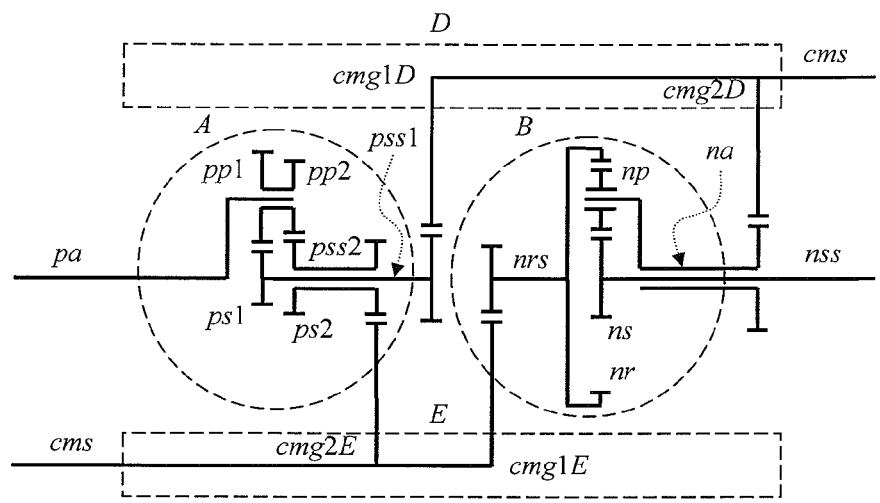
Figure 21:
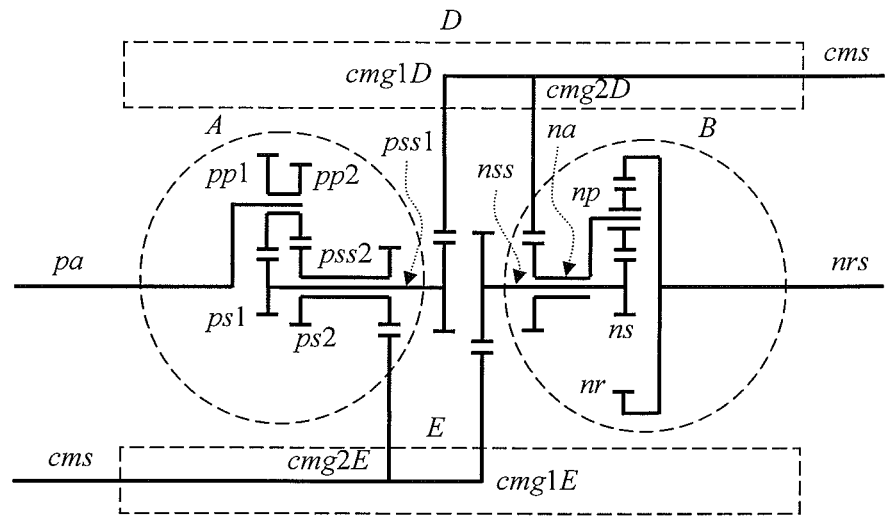
Figure 22:
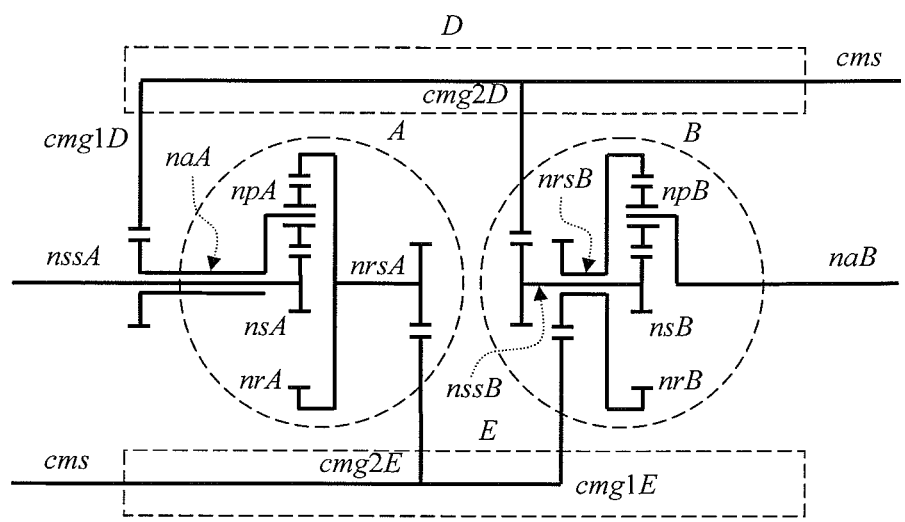
Figure 23:
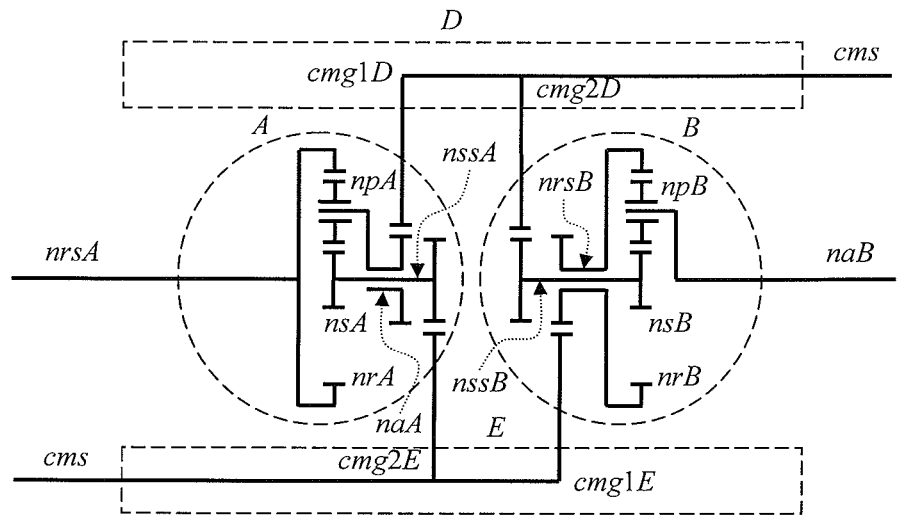
Figure 24:
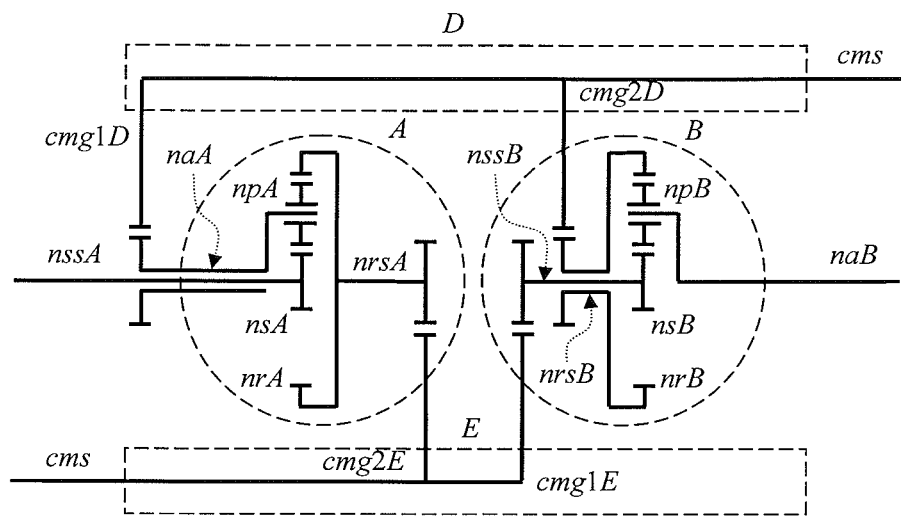
Figure 25:
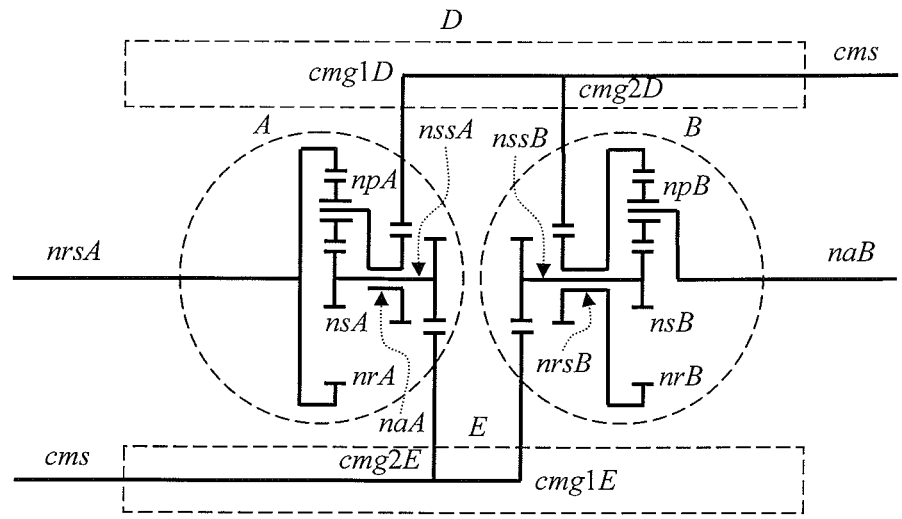
Figure 26:
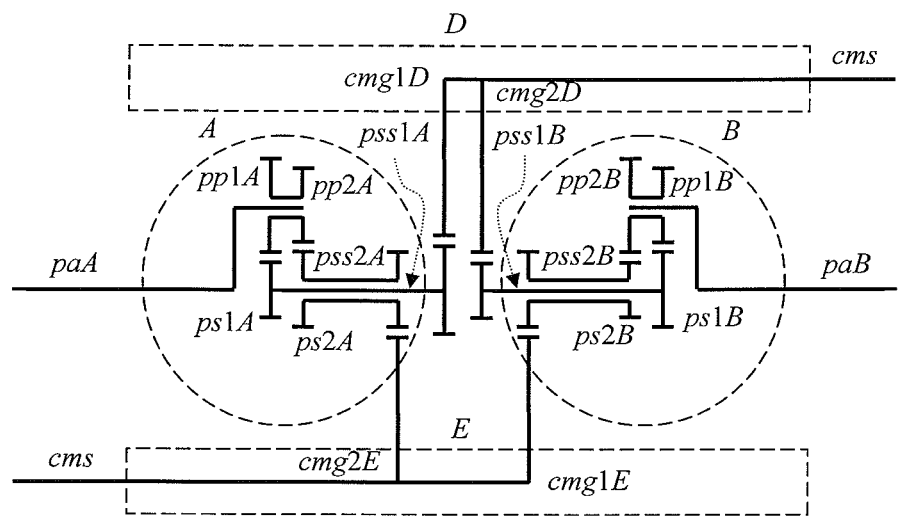
Figure 27:
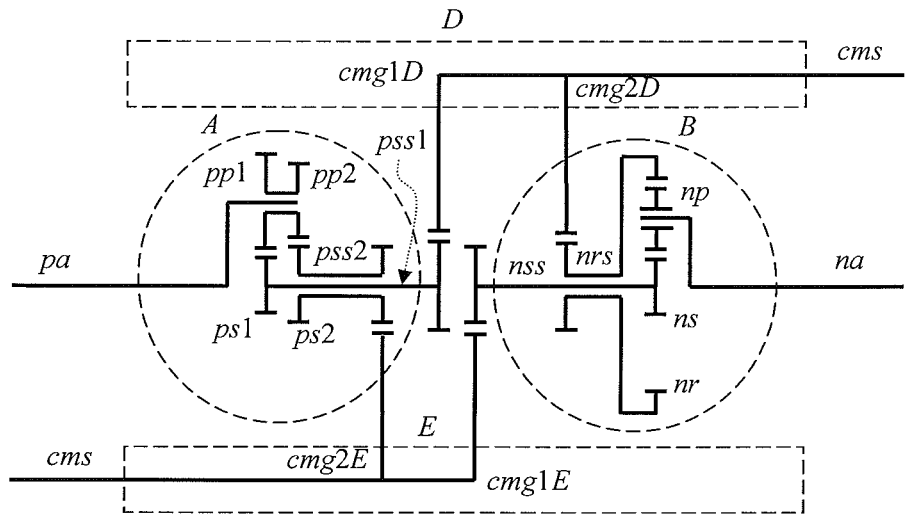
Figure 28:
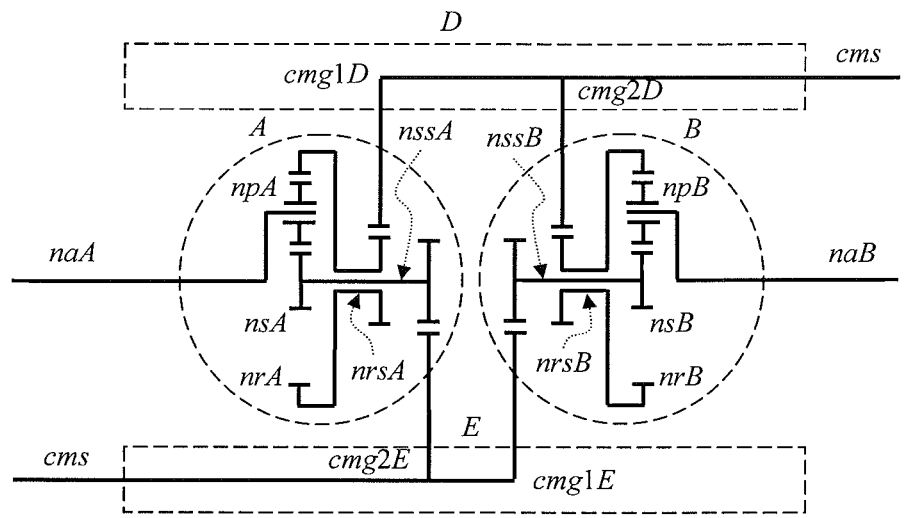
Figure 29:
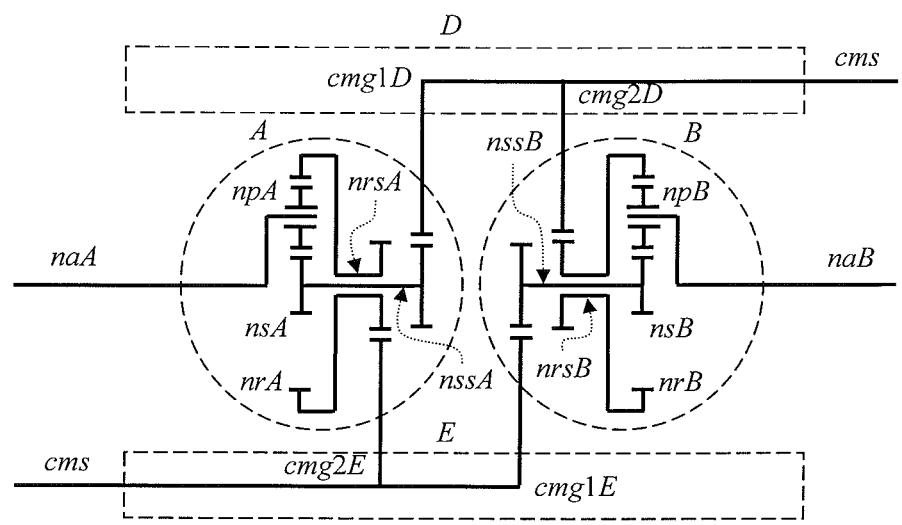

FIG. 4 shows an internal schematic view of a transmission-connecting set applied in the independently controllable transmission mechanism with series types in accordance with the preferred embodiment of the present invention, which is not limitative of the present invention. Referring to FIG. 4, the transmission-connecting set includes a rotational axle identified as cms, a first gear identified as cmg1 and a second gear identified as cmg2 mounted thereon.

Referring again to FIGS. 2 and 4, when the rotational axle cms selectively performs as the first power input end SD of the first transmission-connecting set 3, the first gear cmg1 and the second gear cmg2 are engaged with the second rotational axle AD of the first planetary gear train 1 and the second rotational axle BD of the second planetary gear train 2, respectively. Alternatively, when the rotational axle cms selectively performs as the free-transmission end SE of the second transmission-connecting set 4, the second gear cmg2 and the first gear cmg1 are engaged with the third rotational axle AE of the first planetary gear train 1 and the third rotational axle BE of the second planetary gear train 2, respectively.

Referring back to FIG. 2, the relation between the speeds of the second rotational axle AD of the first planetary gear train 1 and the second rotational axle BD of the second planetary gear train 2 in accordance with the present invention is given as: $n_{BD} = \alpha n_{AD}$ where $n_{AD}$ and $n_{BD}$ are speeds of the second rotational axle AD of the first planetary gear train 1 and the second rotational axle BD of the second planetary gear train 2, and $\alpha$ is a first parameter.

Furthermore, the relation between the speeds of the first rotational axle OP (first power output end) of the first planetary gear train 1 and the first rotational axle CR (transmission control end) of the second planetary gear train 2 in accordance with the present invention is given as: $n_{CR} = \beta n_{OP}$ where $n_{OP}$ and $n_{CR}$ are speeds of the first rotational axle OP of the first planetary gear train 1 and the first rotational axle CR of the second planetary gear train 2, and $\beta$ is a second parameter.

Furthermore, the relation between the speeds of the third rotational axle AE of the first planetary gear train 1 and the third rotational axle BE of the second planetary gear train 2 in accordance with the present invention is given as: $n_{AE} = n_{BE}$ where $n_{AE}$ and $n_{BE}$ are speeds of the third rotational axle AE of the first planetary gear train 1 and the third rotational axle BE of the second planetary gear train 2.

FIGS. 5 through 29 show internal schematic views of combinations of two planetary gear trains and two transmission-connecting sets formed in the independently controllable transmission mechanism in accordance with first through twenty-fifth embodiments of the present invention, wherein twenty five embodiments of the transmission mechanisms are shown, which are not limitative of the present invention. Turning now to FIGS. 5 through 29, the transmission mechanism includes two planetary gear trains (as indicated at dotted-line circles in FIGS. 3A and 3B) and two transmission-connecting sets (as indicated at a dotted-line rectangle in FIG. 4). As has been described in FIGS. 3A, 3B and 4, the detailed configurations of the planetary gear trains and the transmission-connecting sets in FIGS. 5 through 29 will not be described for the sake of clarity.

Referring again to FIGS. 2 and 5, in the first embodiment, the two planetary gear trains correspond to the first planetary gear train 1 and the second planetary gear train 2 and are comprised of two planetary gear trains each of which has a positive speed ratio. The two planetary gear trains are serially connected to form a series type and correspond to the first transmission-connecting set 3 and the second transmission-connecting set 4. One of two sun-gear rotational axles pss1A, pss1B of the two planetary gear trains performs as one of the first power output end of the first planetary gear train 1 (i.e. first rotational axle OP) and the transmission control end of the second planetary gear train 2 (i.e. first rotational axle CR). Two planet gear carriers paA, paB, two central-gear rotational axles pss2A, pss2B connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 6, in the second embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of two sun-gear rotational axles ps1, nss of the two planetary gear trains performs as one of the first power output end of the first planetary gear train 1 (i.e. first rotational axle OP) and the transmission control end of the second planetary gear train 2 (i.e. first rotational axle CR). Two planet gear carriers pa, na, a central-gear rotational axle pss2 and a ring-gear rotational axle nrs connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 7, in the third embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two sun-gear rotational axles nssA, nssB of the two planetary gear trains performs as one of the first power output end of the first planetary gear train 1 (i.e. first rotational axle OP) and the transmission control end of the second planetary gear train 2 (i.e. first rotational axle CR). Two planet gear carriers naA, naB and two ring-gear rotational axles nrsA, nrsB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 8, in the fourth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a sun-gear rotational axle pss1 and a ring-gear rotational axle nrs of the two planetary gear trains performs as one of the first power output end of the first planetary gear train 1 (i.e. first rotational axle OP) and the transmission control end of the second planetary gear train 2 (i.e. first rotational axle CR). Two planet gear carriers pa, na, a central-gear rotational axle pss2 and a sun-gear rotational axle nss connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 9, in the fifth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a sun-gear rotational axle nssA and a ring-gear rotational axle nrsB of the two planetary gear trains performs as one of the first power output end of the first planetary gear train 1 (i.e. first rotational axle OP) and the transmission control end of the second planetary gear train 2 (i.e. first rotational axle CR). Two planet gear carriers naA, naB, a ring-gear rotational axle nrsA and a sun-gear rotational axle nssB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 10, in the sixth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two ring-gear rotational axles nrsA, nrsB of the two planetary gear trains performs as one of the first power output end of the first planetary gear train 1 (i.e. first rotational axle OP) and the transmission control end of the second planetary gear train 2 (i.e. first rotational axle CR). Two planet gear carriers naA, naB and two sun-gear rotational axles nssA, nssB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 11, in the seventh embodiment, the two planetary gear trains correspond to the first planetary gear train 1 and the second planetary gear train 2 and are comprised of two planetary gear trains each of which has a positive speed ratio. The two planetary gear trains are serially connected to form a series type and correspond to the first transmission-connecting set 3 and the second transmission-connecting set 4. One of a sun-gear rotational axle pss1A and a central-gear rotational axle pss2B of the two planetary gear trains performs as one of the first power output end of the first planetary gear train 1 (i.e. first rotational axle OP) and the transmission control end of the second planetary gear train 2 (i.e. first rotational axle CR). A planet gear carrier paA, a sun-gear rotational axle pss1B, a central-gear rotational axle pss2A and a planet gear carrier paB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 12, in the eighth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of two sun-gear rotational axles pss1, nss of the two planetary gear trains performs as one of the first power output end of the first planetary gear train 1 (i.e. first rotational axle OP) and the transmission control end of the second planetary gear train 2 (i.e. first rotational axle CR). A planet gear carrier pa, a ring-gear rotational axle nrs, a central-gear rotational axle pss2 and a planet gear carrier na connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 13, in the ninth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a sun-gear rotational axle pss1 and a ring-gear rotational axle nrs of the two planetary gear trains performs as one of the first power output end of the first planetary gear train 1 (i.e. first rotational axle OP) and the transmission control end of the second planetary gear train 2 (i.e. first rotational axle CR). A planet gear carrier pa, a sun-gear rotational axle nss, a central-gear rotational axle pss2 and a planet gear carrier na connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 14, in the tenth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two sun-gear rotational axles nssA, nssB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a ring-gear rotational axle nrsB, a ring-gear rotational axle nrsA and a planet gear carrier naB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 15, in the eleventh embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a sun-gear rotational axle nssA and a ring-gear rotational axle nrsB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a sun-gear rotational axle nssB, a ring-gear rotational axle nrsA and a planet gear carrier naB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 16, in the twelfth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two ring-gear rotational axles nrsA, nrsB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a sun-gear rotational axle nssB, a sun-gear rotational axle nssA and a planet gear carrier naB connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 17, in the thirteenth embodiment, the two planetary gear trains correspond to the first planetary gear train 1 and the second planetary gear train 2 and are comprised of two planetary gear trains each of which has a positive speed ratio. The two planetary gear trains are serially connected to form a series type and correspond to the first transmission-connecting set 3 and the second transmission-connecting set 4. One of a sun-gear rotational axle pss1A and a planet gear carrier paB of the two planetary gear trains performs as one of the first power output end of the first planetary gear train 1 (i.e. first rotational axle OP) and the transmission control end of the second planetary gear train 2 (i.e. first rotational axle CR). A planet gear carrier paA, a sun-gear rotational axle pss1B and two central-gear rotational axles pss2A, pss2B connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 18, in the fourteenth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a sun-gear rotational axle pss1 and a planet gear carrier na of the two planetary gear trains performs as one of the first power output end of the first planetary gear train 1 (i.e. first rotational axle OP) and the transmission control end of the second planetary gear train 2 (i.e. first rotational axle CR). A planet gear carrier pa, a sun-gear rotational axle nss, a central-gear rotational axle pss2 and a ring-gear rotational axle nrs connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 19, in the fifteenth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a sun-gear rotational axle pss1 and a planet gear carrier na of the two planetary gear trains performs as one of the first power output end of the first planetary gear train 1 (i.e. first rotational axle OP) and the transmission control end of the second planetary gear train 2 (i.e. first rotational axle CR). A planet gear carrier pa, a ring-gear rotational axle nrs, a central-gear rotational axle pss2 and a sun-gear rotational axle nss connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 20, in the sixteenth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a planet gear carrier pa and a sun-gear rotational axle nss of the two planetary gear trains performs as one of the first power output end of the first planetary gear train 1 (i.e. first rotational axle OP) and the transmission control end of the second planetary gear train 2 (i.e. first rotational axle CR). A sun-gear rotational axle pss1, a planet gear carrier na, a central-gear rotational axle pss2 and a ring-gear rotational axle nrs connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 21, in the seventeenth embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of a planet gear carrier pa and a ring-gear rotational axle nrs of the two planetary gear trains performs as one of the first power output end of the first planetary gear train 1 (i.e. first rotational axle OP) and the transmission control end of the second planetary gear train 2 (i.e. first rotational axle CR). A sun-gear rotational axle pss1, a planet gear carrier na, a central-gear rotational axle pss2 and a sun-gear rotational axle nss connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 22, in the eighteenth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a sun-gear rotational axle nssA and a planet gear carrier naB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a sun-gear rotational axle nssB and two ring-gear rotational axles nrsA, nrsB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 23, in the nineteenth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a ring-gear rotational axle nrsA and a planet gear carrier naB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a sun-gear rotational axle nssB, a sun-gear rotational axle nssA and a ring-gear rotational axle nrsB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 24, in the twentieth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a sun-gear rotational axle nssA and a planet gear carrier naB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a ring-gear rotational axle nrsB, a ring-gear rotational axle nrsA and a sun-gear rotational axle nssB connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 25, in the twenty-first embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of a ring-gear rotational axle nrsA and a planet gear carrier naB of the two planetary gear trains performs as one of the first power output end of the first planetary gear train 1 (i.e. first rotational axle OP) and the transmission control end of the second planetary gear train 2 (i.e. first rotational axle CR). A planet gear carrier naA, a ring-gear rotational axle nrsB and two sun-gear rotational axles nssA, nssB connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 26, in the twenty-second embodiment, the two planetary gear trains correspond to the first planetary gear train 1 and the second planetary gear train 2 and are comprised of two planetary gear trains each of which has a positive speed ratio. The two planetary gear trains are serially connected to form a series type and correspond to the first transmission-connecting set 3 and the second transmission-connecting set 4. One of two planet gear carriers paA, paB of the two planetary gear trains performs as one of the first power output end of the first planetary gear train 1 (i.e. first rotational axle OP) and the transmission control end of the second planetary gear train 2 (i.e. first rotational axle CR). Two sun-gear rotational axles pss1A, pss1B and two central-gear rotational axles pss2A, pss2B connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 27, in the twenty-third embodiment, the two planetary gear trains correspond to the first planetary gear train 1 and the second planetary gear train 2 and are comprised of a planetary gear train having a positive speed ratio and a planetary gear train having a negative speed ratio. The two planetary gear trains are serially connected to form a series type and correspond to the first transmission-connecting set 3 and the second transmission-connecting set 4. One of two planet gear carriers pa, na of the two planetary gear trains performs as one of the first power output end of the first planetary gear train 1 (i.e. first rotational axle OP) and the transmission control end of the second planetary gear train 2 (i.e. first rotational axle CR). A sun-gear rotational axle pss1, a ring-gear rotational axle nrs, a central-gear rotational axle pss2 and a sun-gear rotational axle nss connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2). Referring again to FIGS. 2 and 28, in the twenty-fourth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two planet gear carriers naA, naB of the two planetary gear trains performs as one of the first power output end of the first planetary gear train 1 (i.e. first rotational axle OP) and the transmission control end of the second planetary gear train 2 (i.e. first rotational axle CR). Two ring-gear rotational axles nrsA, nrsB and two sun-gear rotational axles nssA, nssB connect with the two transmission-connecting sets. One of two rotational axles cms of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Referring again to FIGS. 2 and 29, in the twenty-fifth embodiment, the two planetary gear trains correspond to the first planetary gear train 1 and the second planetary gear train 2 and are comprised of two planetary gear trains each of which has a negative speed ratio. The two planetary gear trains are serially connected to form a series type and correspond to the first transmission-connecting set 3 and the second transmission-connecting set 4. One of two planet gear carriers naA, naB of the two planetary gear trains performs as one of the first power output end of the first planetary gear train 1 (i.e. first rotational axle OP) and the transmission control end of the second planetary gear train 2 (i.e. first rotational axle CR). A sun-gear rotational axle nssA, a ring-gear rotational axle nrsB, a ring-gear rotational axle nrsA and a sun-gear rotational axle nssB connect with the two transmission-connecting sets. One of two rotational axles ems of the transmission-connecting sets performs as one of the rotational axle SD of the first transmission-connecting set 3 (first power input end shown in FIG. 2) and the rotational axle SE of the second transmission-connecting set 4 (free-transmission end shown in FIG. 2).

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. An independently controllable transmission mechanism comprising:
   a first planetary gear train including a first power output end;
   a second planetary gear train serially connected with the first planetary gear train to form a series type, the second planetary gear train including a transmission control end;
   a first transmission-connecting set mechanically connected with the first planetary gear train and the second planetary gear train, the first transmission-connecting set including a first power input end; and
   a second transmission-connecting set mechanically connected with the first planetary gear train and the second planetary gear train, second transmission-connecting set including a free-transmission end;

wherein the transmission control end controls the free-transmission end to be functioned as a second power input end or a second power output end.

2. The independently controllable transmission mechanism as defined in claim 1, wherein each of the first planetary gear train and the second planetary gear train has a positive speed ratio.

3. The independently controllable transmission mechanism as defined in claim 1, wherein each of the first planetary gear train and the second planetary gear train has a negative speed ratio.

4. The independently controllable transmission mechanism as defined in claim 1, wherein the first planetary gear train has a positive speed ratio while the second planetary gear train has a negative speed ratio, or wherein the first planetary gear train has a negative speed ratio while the second planetary gear train has a positive speed ratio.

5. The independently controllable transmission mechanism as defined in claim 1, wherein the first planetary gear train includes a first rotational axle, a second rotational axle and a third rotational axle; the first rotational axle of the first planetary gear train performed as the first power output end, the second rotational axle of the first planetary gear train connected with the first transmission-connecting set, and the third rotational axle of the first planetary gear train connected with the second transmission-connecting set; and wherein the second planetary gear train includes a first rotational axle, a second rotational axle and a third rotational axle; the first rotational axle of the second planetary gear train performed as the transmission control end, the second rotational axle of the second planetary gear train connected with the first transmission-connecting set, and the third rotational axle of the second planetary gear train connected with the second transmission-connecting set;

wherein the first transmission-connecting set has a rotational axle performed as the first power input end and the second transmission-connecting set has a rotational axle performed as the free-transmission end.

6. The independently controllable transmission mechanism as defined in claim 1, wherein the first power output end and the free-transmission end extend in parallel and the first power input end and the transmission control end extend in parallel.

7. An independently controllable transmission mechanism comprising:
a first planetary gear train including a transmission control end;
a second planetary gear train serially connected with the first planetary gear train to form a series type, the second planetary gear train including a first power output end;
a first transmission-connecting set mechanically connected with the first planetary gear train and the second planetary gear train, the first transmission-connecting set including a first power input end; and
a second transmission-connecting set mechanically connected with the first planetary gear train and the second planetary gear train, second transmission-connecting set including a free-transmission end;
wherein the transmission control end controls the free-transmission end to be functioned as a second power input end or a second power output end.

8. The independently controllable transmission mechanism as defined in claim 7, wherein each of the first planetary gear train and the second planetary gear train has a positive speed ratio.

9. The independently controllable transmission mechanism as defined in claim 7, wherein each of the first planetary gear train and the second planetary gear train has a negative speed ratio.

10. The independently controllable transmission mechanism as defined in claim 7, wherein the first planetary gear train has a positive speed ratio while the second planetary gear train has a negative speed ratio, or wherein the first planetary gear train has a negative speed ratio while the second planetary gear train has a positive speed ratio.

11. The independently controllable transmission mechanism as defined in claim 7, wherein the first planetary gear train includes a first rotational axle, a second rotational axle and a third rotational axle; the first rotational axle of the first planetary gear train performed as the transmission control end, the second rotational axle of the first planetary gear train connected with the first transmission-connecting set, and the third rotational axle of the first planetary gear train connected with the second transmission-connecting set; and wherein the second planetary gear train includes a first rotational axle, a second rotational axle and a third rotational axle; the first rotational axle of the second planetary gear train performed as the first power output end, the second rotational axle of the second planetary gear train connected with the first transmission-connecting set, and the third rotational axle of the second planetary gear train connected with the second transmission-connecting set;

wherein the first transmission-connecting set has a rotational axle performed as the first power input end and the second transmission-connecting set has a rotational axle performed as the free-transmission end.

12. The independently controllable transmission mechanism as defined in claim 7, wherein the first power output end and the free-transmission end extend in parallel and the first power input end and the transmission control end extend in parallel.

13. An independently controllable transmission mechanism comprising:
two planetary gear trains serially connected to form a serial type;
two transmission-connecting sets connected with the two planetary gear trains;
a first power output end provided on the two serially-connected planetary gear trains;
a transmission control end provided on the two serially-connected planetary gear trains;
a first power input end provided on the two transmission-connecting sets; and
a free-transmission end provided on the transmission-connecting sets;
wherein the transmission control end controls the free-transmission end to be functioned as a second power input end or a second power output end.

14. The independently controllable transmission mechanism as defined in claim 13, wherein each of the planetary gear trains has a positive speed ratio.

15. The independently controllable transmission mechanism as defined in claim 13, wherein each of the planetary gear trains has a negative speed ratio.

16. The independently controllable transmission mechanism as defined in claim 13, wherein a first of the two planetary gear trains has a positive speed ratio while a second of the two planetary gear trains has a negative speed ratio.

17. The independently controllable transmission mechanism as defined in claim 13, wherein the two planetary gear trains include a first rotational axle, a second rotational axle, a third rotational axle, a fourth rotational axle, a fifth rotational axle and a sixth rotational axle; the first rotational axle performed as the first power output end, the second rotational axle and the third rotational axle connected with the two transmission-connecting sets, the fourth rotational axle performed as the transmission control end, and the fifth rotational axle and the sixth rotational axle connected with the two transmission-connecting sets; and wherein the two transmission-connecting sets have two rotational axles performed as the first power input end and the free-transmission end.

18. The independently controllable transmission mechanism as defined in claim 13, wherein the first power output end and the free-transmission end extend in parallel and the first power input end and the transmission control end extend in parallel.

* * * * *